(12) United States Patent
McKeown et al.

(10) Patent No.: US 6,956,851 B1
(45) Date of Patent: Oct. 18, 2005

(54) CROSSBAR SUBSYSTEM AND METHOD

(75) Inventors: Nicholas McKeown, Stanford, CA (US); Costas Calamvokis, Mountain View, CA (US)

(73) Assignee: PMC-Sierra, Inc., Burnaby (CA)

( * ) Notice: Subject to any disclaimer, the term of this patent is extended or adjusted under 35 U.S.C. 154(b) by 684 days.

(21) Appl. No.: 09/789,651

(22) Filed: Feb. 20, 2001

(51) Int. Cl.$^7$ ............................................. H04L 12/50
(52) U.S. Cl. .................................. 370/369; 370/388
(58) Field of Search ........................... 370/369, 370, 370/371, 372, 376, 377, 378, 379, 380, 388

(56) References Cited

U.S. PATENT DOCUMENTS

| | | | | |
|---|---|---|---|---|
| 4,251,880 A | * | 2/1981 | Baugh et al. | 370/468 |
| 5,377,333 A | * | 12/1994 | Nakagoshi et al. | 710/317 |
| 5,390,178 A | * | 2/1995 | Hunter | 370/370 |
| 5,517,493 A | * | 5/1996 | Uekama et al. | 370/370 |
| 5,825,773 A | * | 10/1998 | Shutoh et al. | 370/398 |
| 5,898,692 A | * | 4/1999 | Dunning et al. | 370/427 |
| 6,147,990 A | * | 11/2000 | Andrews et al. | 370/380 |
| 6,240,063 B1 | * | 5/2001 | Suzuki | 370/217 |
| 6,430,180 B1 | * | 8/2002 | Bohm et al. | 370/369 |
| 6,704,312 B1 | * | 3/2004 | Chang et al. | 370/389 |

\* cited by examiner

*Primary Examiner*—Ricky Ngo
*Assistant Examiner*—Christine Ng
(74) *Attorney, Agent, or Firm*—Townsend and Townsend and Crew LLP

(57) ABSTRACT

A system is disclosed for routing data cells from at least one of a plurality of source port processors to at least one destination port processor. Such a system contemplates each cell comprising a plurality of cell frame portions. In a preferred embodiment of the system of the present invention, each cell generated by the at least one source port processor is separated into its constituent frame portions. Each frame portion has associated therewith a first characteristic and a second characteristic. The cell portions are transmitted to at least one port associated with at least one crossbar chip. The at least one port is in communication with at least two of the plurality of source port processors. Each cell portion is selectively transmitted according to its first characteristic to a corresponding one of the crossbar chips. Each cell portion is selectively transmitted according to its second characteristic to a corresponding one of the ports of the corresponding one of the crossbar chips. Each cell portion is selectively redirected according to its second characteristic to a corresponding one of the ports. Each cell portion is transmitted to a corresponding one of the at least one destination port processors.

14 Claims, 8 Drawing Sheets

CROSSBAR SUBSYSTEM AND METHOD

BACKGROUND OF THE INVENTION

1. Field of the Invention

The present invention relates generally to data handling systems and, more particularly, to a high speed router or ATM (asynchronous transfer mode) switch employing a crossbar type switch configured in a manner which can rapidly and efficiently process data packets while minimizing the number of I/Os per crossbar chip.

2. Description of the Background Art

There is increasing interest in providing communications between disparate computer systems and even between networks of differing characteristics. Further, with the availability of very high bandwidth trunk lines, e.g., using fiber optic cables, there is increasing interest in combining traffic from a great variety of sources for transmission through a single trunk line. For wide area networks, packet switching technology is widely used where information to be transmitted is broken into packets of data which are preceded by headers containing information useful in routing. The header may also identify the source and the destination. Whether truly packet switched or not, most digital communication systems employ message formats in which there is an identifying header of some sort.

As is well known, data network usage is expanding at a great rate both in terms of private networks and also public networks such as the Internet. While transmission link bandwidths keep improving, the technology of the systems which connect the links has lagged behind. In particular, routers are needed which can keep up with the higher transmission link bandwidths. A high speed router needs to achieve three goals. First, it needs to have enough internal bandwidth to move packets between its input and output interfaces at the desired rates. Second, it needs enough packet processing power at the interfaces to forward the packets and, third, the router needs to be able to redirect the packets between possible paths at the requisite rates.

A typical router system employs at least one crossbar switch comprising a matrix of transmission pathways terminating in I/O nodes. Each of these I/O nodes is adapted to receive packets from a corresponding input interface and transmit packets to a corresponding output interface. As the number of interfaces utilizing a router system grows, a proportional strain is placed on the crossbar switches, which have a practical limit on the number of I/O nodes incorporated thereby. As such, of interest to designers of crossbar switches is the ability to maximize the number of interfaces with which a given number of I/O nodes communicate without compromising crossbar switch performance.

Accordingly, what is needed in the art is a crossbar subsystem that maximizes the number of interfaces with which a constrained number of I/O nodes can communicate with no degradation of functional capability.

SUMMARY OF THE INVENTION

In accordance with the present invention, a system is disclosed for routing data cells from at least one of a plurality of source port processors to at least one destination port processor. Such a system contemplates each cell comprising a plurality of cell frame portions.

In a preferred embodiment of the system of the present invention, each cell generated by the at least one source port processor is separated into its constituent frame portions. Each frame portion has associated therewith a first characteristic and a second characteristic. The cell portions are transmitted to at least one port associated with at least one crossbar chip. The at least one port is in communication with at least two of the plurality of source port processors. Each cell portion is selectively transmitted according to its first characteristic to a corresponding one of the crossbar chips. Each cell portion is selectively transmitted according to its second characteristic to a corresponding one of the ports of the corresponding one of the crossbar chips. Each cell portion is selectively redirected according to its second characteristic to a corresponding one of the ports. Each cell portion is then transmitted to a corresponding one of the at least one destination port processors.

BRIEF DESCRIPTION OF THE DRAWINGS

The teachings of the present invention can be readily understood by considering the following detailed description in conjunction with the accompanying drawings.

DESCRIPTION OF THE SPECIFIC EMBODIMENTS

Figure 1:
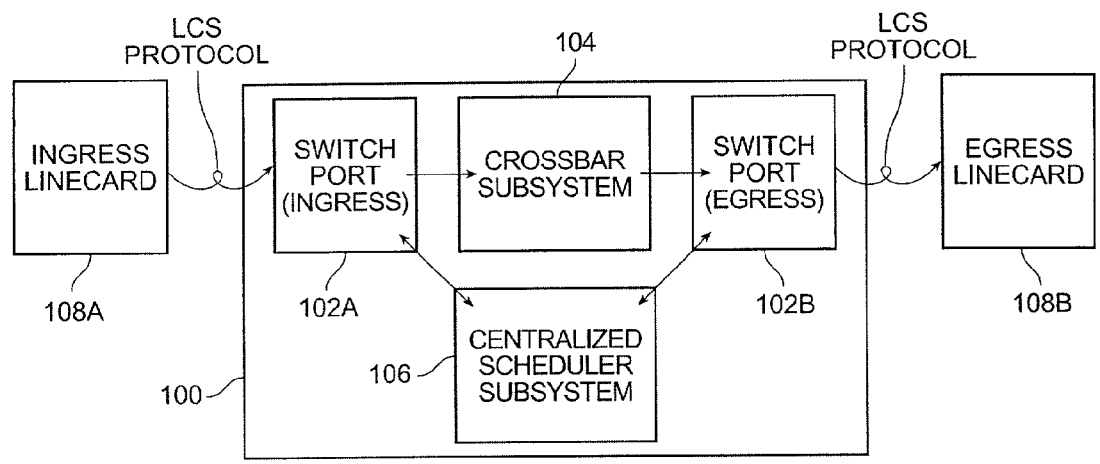
FIG. 1 is a block diagram depicting logical interconnects of a crossbar-based switch core in accordance with a preferred embodiment of the present invention.

FIG. 1 is a block diagram depicting logical interconnects of a crossbar-based switch core 100 in accordance with a preferred embodiment of the present invention. The switch core 100, for the purpose of describing the preferred embodiment, includes three types of devices: ports 102A, 102B, crossbar subsystem 104 and centralized scheduler subsystem 106.

Ingress port 102A and egress port 102B are respectively coupled to an ingress linecard 108A and egress linecard 108B, each of linecards 108A, 108B being outside the switch core 100. In a preferred embodiment, the ports 102 include shallow queues and implement a linecard-to-switch (LCS) protocol. Note that, with reference to FIG. 1, ports 102A, 102B are depicted as and may comprise separate instruments; in the preferred embodiment of the present invention, however, ports 102A, 102B comprise an integrated instrument.

The ports 102 may have shallow (e.g., 64 cell) queues in both ingress and egress directions. These queues may compensate for the latency between each linecard 108 and the core 100. In one perspective, such queues act as extensions of queues within the linecards.

A LCS protocol may provide an interface between linecards 108 and the switch core 100. In a preferred embodiment, the LCS protocol has per-queue, credit-based flow control which ensures that the queues are not overrun. A preferred embodiment for a LCS protocol is described in commonly owned U.S. patent application Ser. No. 09/303,765, entitled "Packet Switch System," filed Apr. 29, 1999, with co-inventors Nicholas McKeown, Costas Calamvokis, Shang-Tse Chuang, and Steven Lin, the disclosure of which is incorporated by reference.

The ports 102 and scheduler 106 exchange information about cells that are waiting to be forwarded through the crossbar 104. A cell is a fixed-length packet. The scheduler 106 maintains local information pertaining to the number of cells that are waiting in all of the ingress queues of ports 102. In addition, the scheduler 106 instructs the ports 102 as to which cell they can forward through the crossbar 104 at each cell time (or interval).

Figure 2:
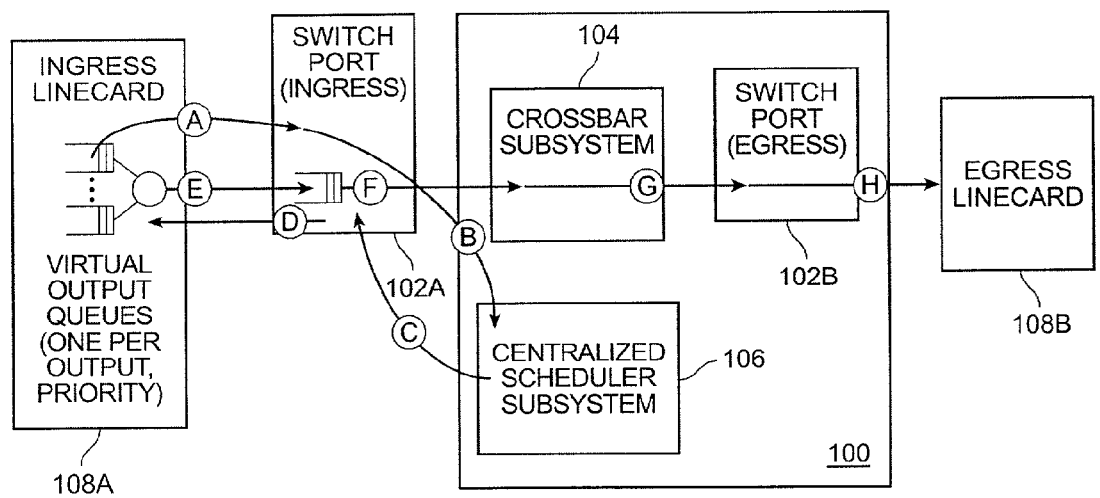
FIG. 2 depicts unicast best-effort cell flow through the switch core of FIG. 1.

FIG. 2 shows a high-level overview of how unicast best-effort cells flow from ingress linecard 108A through switch core 100 to egress linecard 108B. In this example, it is assumed that ingress linecard 108A holds a unicast cell to send to egress linecard 108B at priority 0. The sequence of events, as illustrated in FIG. 2, are as follows:

(A) Ingress linecard 108A sends a LCS request with a label indicating that ingress linecard 108A has been instructed to send a priority 0 unicast cell to egress linecard 108B. In the event that linecard 108A is to send a multicast cell, the label may dictate receipt of the cell or copies thereof by linecards additional to linecard 108B.

(B) When ingress port 102A receives the LCS request, it increments its counter of requests for priority 0 unicast cells destined to egress linecard 108B. Ingress port 102A sends a request to scheduler subsystem 106 indicating that ingress linecard 108A has been instructed to send a unicast priority 0 cell to egress linecard 108B.

(C) Some (possibly long) time later, scheduler subsystem 106 determines a non-conflicting configuration for crossbar 104 that includes the transfer of a priority 0 unicast cell from ingress linecard 108A to egress linecard 108B. The configuration is for some time T in the future. Scheduler subsystem 106 sends a grant signal to ingress switch port 102A indicating that the cell need be received by switch port 102A by time T.

(D) Because the cell is still on ingress linecard 108A, switch port 102A must send a LCS grant/credit signal to ingress linecard 108A requesting that it send the cell to reach switch port 102A by time T. The grant/credit signal carries with it a sequence number that is used by switch port 102A to align the incoming cell for transfer across crossbar 104 at the correct time.

(E) When ingress linecard 108A receives the LCS grant/credit, it transmits the LCS cell along with the sequence number received from switch port 102A. When switch port 102A receives the cell, it places it in a "delay-matching" FIFO where it waits until time T. The delay-matching FIFO effectively delays all cells so that the round-trip time (from switch port 102A to ingress linecard 108A and back to switch port 102A again) is the same for all ports.

(F) At time T, switch port 102A transmits the cell into the crossbar subsystem 104.

(G) The cell passes through crossbar subsystem 104 in a fixed delay.

(H) Once the cell has passed through crossbar subsystem 104, the cell is sent to egress linecard 108B by egress switch port 102B.

Figure 3:
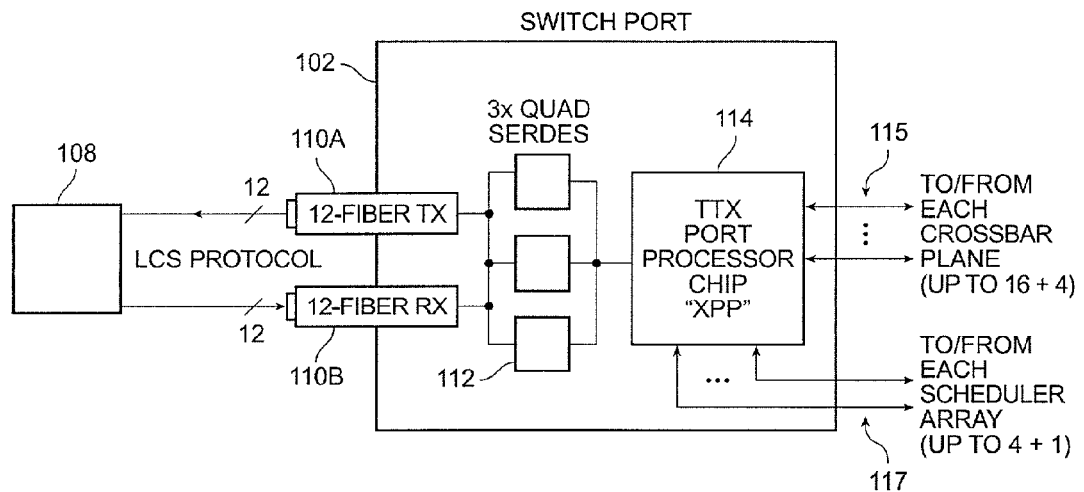
FIG. 3 is a schematic depiction of a switch port associated with the switch core of FIG. 1.

As illustrated in FIG. 3, switch ports 102, as contemplated by a preferred embodiment of the present invention, incorporate three main types of component on the data path: (1) 12-channel fiber-optic components 110A, 110B that transmit data to and receive data from linecard 108; (2) "serdes" (serializer-deserializer) devices 112 that convert each serial LVDS data-stream to and from a parallel bus; and (3) a port processor (XPP) chip 114 that terminates the LCS protocol at switch core 100 and interacts with both scheduler 106 and crossbar 104 subsystems via two-way crossbar I/Os 115 and two-way scheduler I/Os 117.

Port processor chip 114 maintains LCS request counters for each egress switch port 102B. When scheduler subsystem 106 is able to receive new requests, port processor chip 114 selects which of the requests to send. Port processor chip 114 also processes LCS request update control messages from linecard 108.

Another function of port processor chip 114 is to send LCS grant/credit signals to its associated linecard 108, and receive LCS cells from linecard 108. When port processor chip 114 receives a grant signal from scheduler subsystem 106, it sends a LCS grant/credit signal to linecard 108. When linecard 108 replies by sending in a cell from the granted queue, port processor chip 114 stores the cell until the cell is to be sent to crossbar subsystem 104.

Still another function of port processor chip 114 is to forward cells over crossbar subsystem 104. Crossbar subsystem 104, as will be further discussed below, consists of 16 identical planes. When the cell's time for transfer has arrived, port processor chip 114 delivers the cell (along with a reverse routing tag, discussed below in further detail) to one plane of crossbar subsystem 104. A cell is sent to just one crossbar plane as 16 "portions" over 16 consecutive cell times.

Still another function of port processor chip 114 is to receive cells from crossbar subsystem 104. Port processor chip 114 receives cells as a series of portions from each of 16 crossbar planes. Each plane delivers a complete cell to port processor chip 114 every 16 time slots. Port processor chip 114 then immediately sends the cell toward linecard 108.

Still another function of port processor chip 114 is to interact with each plane of scheduler subsystem 106. Scheduler subsystem 106 consists of between one and four separate planes—one plane per best-effort priority class. Port processor chip 114 interacts with each scheduler plane in a number of ways: first, port processor chip 114 sends requests to the scheduler plane corresponding to the priority of the request. Priority 0 requests are sent to the first plane, priority 1 to the second plane, and so on. Secondly, port processor chip 114 receives grant signals from each plane indicating that port processor chip 114 should send a LCS grant/credit signal to linecard 108. Thirdly, port processor chip 114 passes the decisions from one scheduler plane to the next. For example, when the first scheduler plane has made decisions for priority "0," port processor chip 114 passes on the decisions (that affect switch port 102 corresponding to port processor chip 114) to the second priority. Port processor chip 114 likewise functions until all of the priorities have been scheduled. Fourthly, port processor chip 114 receives reverse-routing tags from each scheduler plane so that the routing tag can be sent into crossbar subsystem 104 at the appropriate time.

Figure 4:
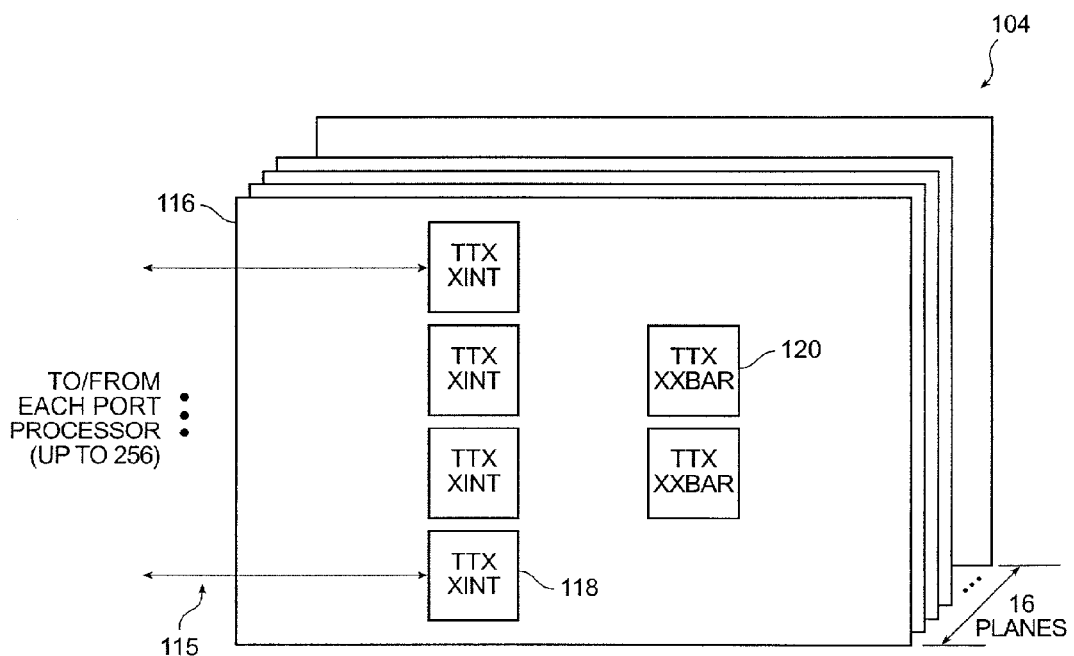
FIG. 4 is a schematic depiction of a crossbar subsystem associated with the switch core of FIG. 1.
Figure 5:
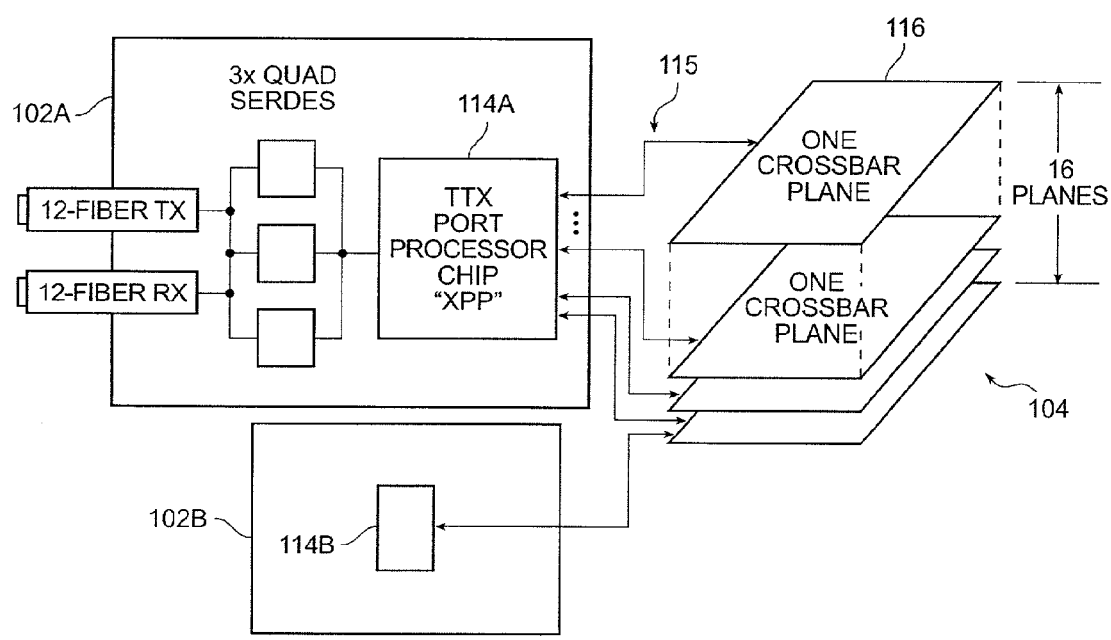
FIG. 5 is a schematic depiction of the interconnection between a switch port and crossbar subsystem associated with the switch core of FIG. 1.

As illustrated in FIGS. 4 and 5, crossbar subsystem 104 consists of multiple identical planes 116. Each plane 116 contains two types of chip: an interchanger chip (XINT) 118 and a crossbar chip (XXBAR) 120. When combined on a single board as shown in FIG. 4, these chips form one of the sixteen 256-port planes 116 of crossbar subsystem 104.

When port processor chip 114 sends a cell through crossbar subsystem 104, chip 114 transmits the cell to only one of the sixteen planes 116; that is, each cell is transmitted to one plane 116 over a period of 16 consecutive time slots. At any one instant, crossbar subsystem 104 is forwarding 16 cells concurrently, one through each plane 116. However, this function is transparent to both linecard 108 and scheduler 106. Sixteen consecutive decisions made by scheduler 106 are used to configure each of the 16 crossbar planes 116 in turn.

As best illustrated in FIG. 5, reverse routing tags (discussed in further detail below) are used to route each cell from an input port processor chip 114A associated with ingress port 102A to one or more output port processor chips 114B associated with egress port 102B. In each time slot, scheduler 106 sends each output port processor chip 114B a reverse routing tag, telling chip 114B from which input chip 114A the output chip 114B can expect to receive a cell. In general, whenever input processor chip 114A initiates the transfer of a new cell destined for output chip 114B over a crossbar plane 116, output chip 114B forwards reverse routing tags to crossbar plane 116 indicating that input chip 114A is the source of the cell destined to output chip 114B. Specifically, and by way of example, if chip 114B is to transmit a first cell payload and receive a second cell payload from chip 114A, chip 114B transmits to crossbar plane 116 the first cell payload and two reverse routing tags indicating that chip 114A is the source of the second cell payload. If input chip 114A is required to transmit a cell payload but is not to receive a cell payload, chip 114A would transmit the cell payload with "dummy" reverse routing tags indicating no payload source. Finally, if chip 114B is to receive a first cell payload from chip 114A but is not to transmit a cell payload, chip 114B transmits to crossbar plane 116 a cell with no payload but with two reverse routing tags indicating that chip 114A is the source of the first cell payload. As such, the reverse routing tag is used to configure crossbar plane 116 so that the cell is delivered correctly. Note that the designation of input chip 114A and output chip 114B is for illustrative purposes only; each port processor chip 114 is adapted to act simultaneously as an input and output chip depending on desired cell source and destination. In this manner, crossbar subsystem 104 can send multicast cells to multiple outputs simultaneously.

In an alternative embodiment of the present invention, forward routing tags may be substituted for reverse routing tags. In such an embodiment, the routing tag issued by input processor chip 114A simply indicates that output chip 114B shall receive the cell payload transmitted by input processor chip 114A.

Figure 6:
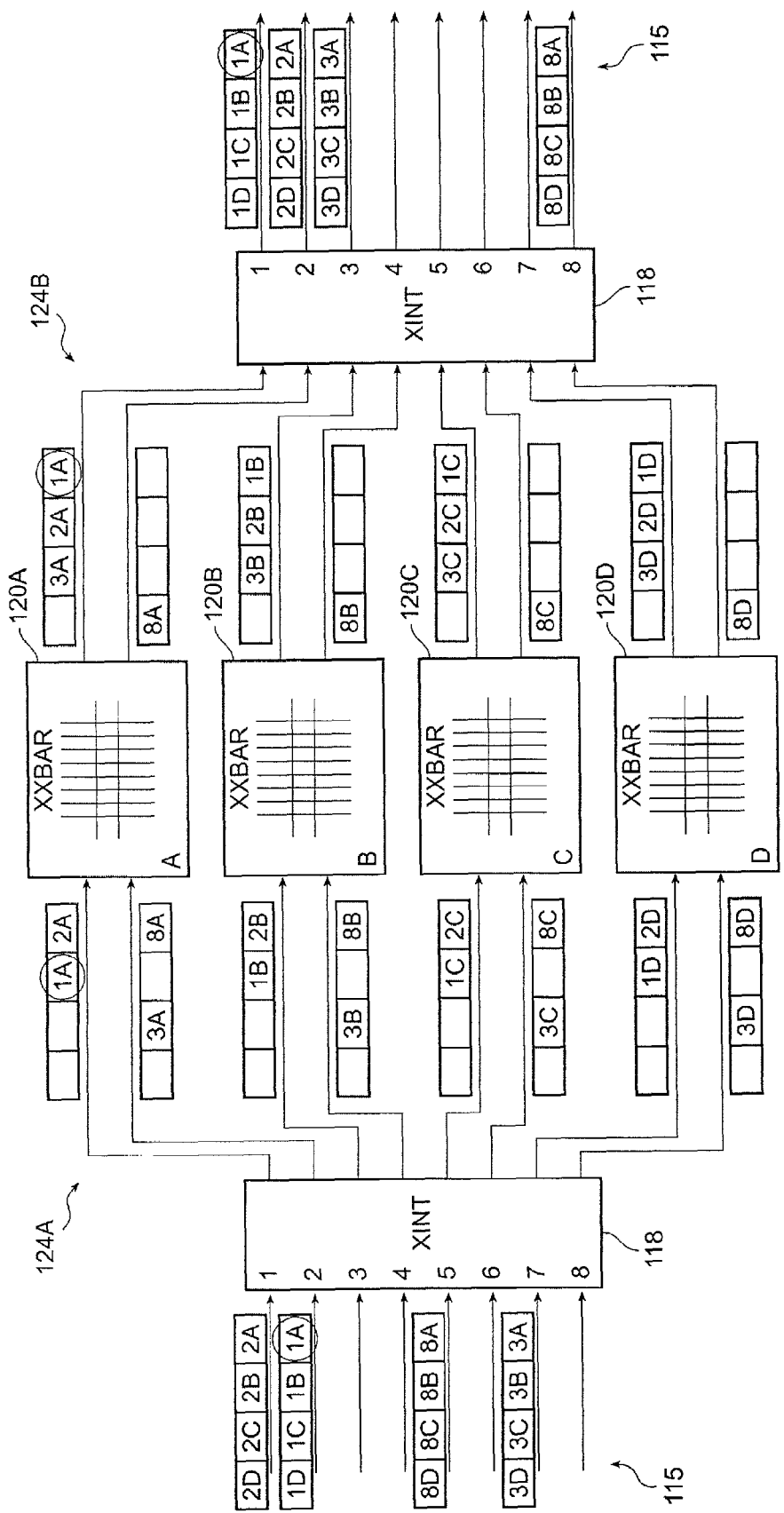
FIG. 6 is a schematic depiction of cell flow through an exemplary crossbar subsystem.

In order to reduce the number of I/Os on each crossbar chip 120, each plane 116 is comprised of several crossbar chips 120 and interchanger chips 118. The technique of the present invention, referred to hereinafter as "interchanging," involves separating each cell into its constituent portions and routing each portion separately over a different crossbar chip 120. To demonstrate this concept, FIG. 6 illustrates how the functionality of an 8×8 crossbar plane (that is, a crossbar plane comprising 8 transmission line rows traversing a first dimension of the crossbar plane and interconnected with 8 transmission line columns traversing a second dimension of the crossbar plane) can be reproduced by 4 identical, but physically separate, 2×8 crossbar chips 120A, 120B, 120C, 120D. Each of crossbar chips 120A, 120B, 120C, 120D incorporate two inputs 124A and two outputs 124B. It is important to note that, in a second regard, the depiction of FIG. 6 is merely illustrative in nature—the actual number of I/Os on the crossbar according to the preferred embodiment of the present invention is different, as will be demonstrated below.

Specifically, FIG. 6 shows how four cells, each of which have associated therewith, for illustrative purposes only, identifying numerals 1, 2, 3 and 8, are routed from inputs (1, 2, 5 and 7) to outputs (2, 1, 8 and 3), respectively. First, each cell is broken into 4 equal-sized time-based portions. For example, the cell arriving at input 1 and destined to output 2 is broken into 4 portions (2A, 2B, 2C, 2D), each of which has associated therewith its identifying numeral (illustratively, numeral 2) and, for illustrative purposes only, a letter (illustratively, A, B, C, D) denotive of the time slot of each portion within its respective cell. Similarly, the cell arriving at input 7 destined to output 3 is broken into 4 portions (3A, 3B, 3C, 3D). The operation of interchanger chip 118 is relatively simple; chip 118 always sends the portions having time slot "A" from all eight inputs to crossbar "A," the time slot "B" portions to crossbar "B," and so on. Interchanger chip 118 forwards the (up to 8) portions using the 2 links from interchanger chip 118 to each corresponding crossbar chip 120. Note that interchanger chip 118 does not perform any switching function; it merely receives cells from each interchanger I/O 115 and sends the cell portions to the corresponding crossbar chip 120. Each crossbar chip 120 switches the 8 arriving portions to 8 departing portions, placing the portions on the correct link and in the correct portion order to enable interchanger chip 118 to output the reassembled cell to the correct port processor chip 114. For example, consider portion "1A" that is circled in FIG. 6. The portion arrives at input 2 destined for output 1. Because portion "1A" arrived at input 2, it is placed in the second portion of the cell destined to crossbar "A." Crossbar "A" determines that portion "1A" is for output 1 (this determination is made from the reverse routing tag issued by output 1) and therefore switches portion "1A" to the first position in the output portion order. Interchanger chip 118, when receiving switched cell portions, always takes the portion in this first position from crossbar "A" and sends such portion to output 1. As such, portion "1A" is directed to the correct output.

Each plane 116 in crossbar subsystem 104, according to the preferred embodiment of the present invention, will operate as up to a 256×256 crossbar, and in its maximum configuration is arranged as shown in and discussed below with reference to FIG. 7. Each crossbar chip 120A, 120B operates internally as a 128×256 crossbar core with 128 I/Os. The portions of arriving cells are spread across both crossbars 120A, 120B by four interchanger chips 118 (only 3 of which are shown). Each of chips 118 is connected to 64 port processor chips 114. Each interchanger chip 118 employs 32 separate I/O connections to each of crossbar chips 120A, 120B.

As such, and in a manner as described above in the example depicted in FIG. 6, the crossbar chips 120 switch up to 256 arriving portions to 256 outgoing portions. The 256 portions, however, arrive over only 128 I/O links 130 per chip 120. The first portion of a cell received by each crossbar chip 120 contains a reverse-routing tag. The tag is used to configure crossbar chip 120 for the duration of the entire cell. Each interchanger chip 118 connects up to 64 port processor chips 114 to up to two crossbar chips 120.

Figure 7A:
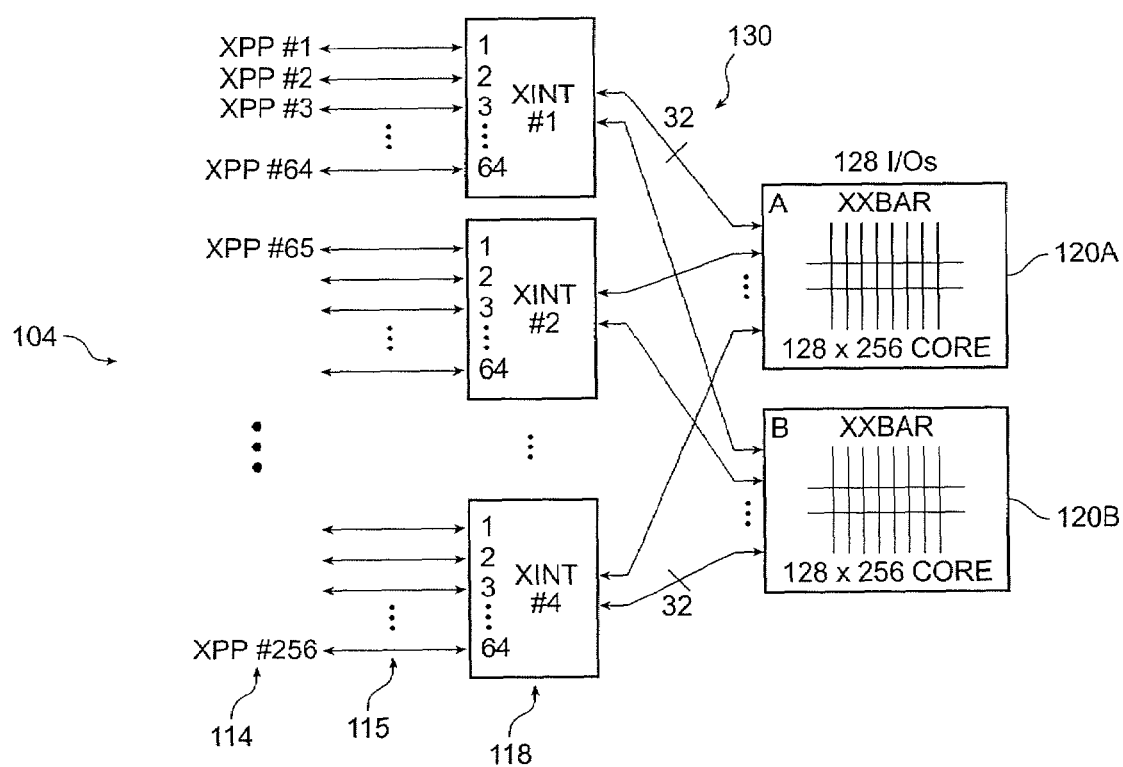
FIG. 7 is a schematic depiction of cell flow through a crossbar subsystem associated with the switch core of FIG. 1.
Figure 7B:
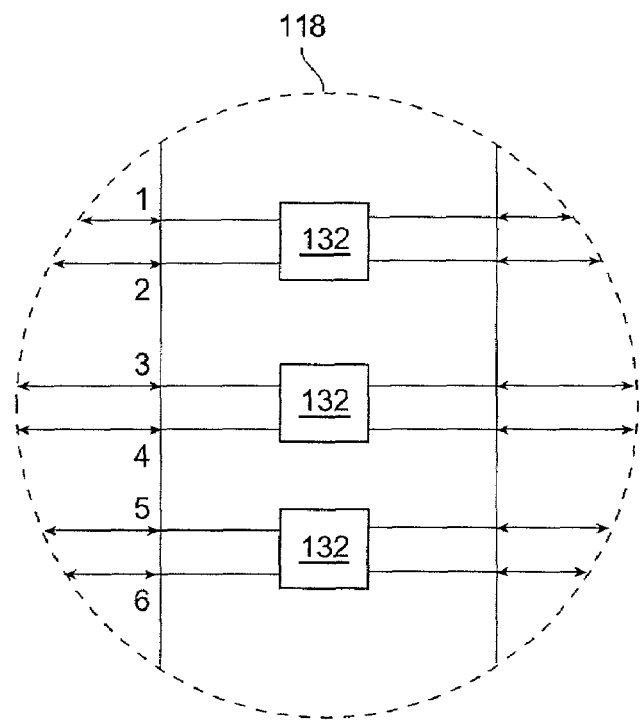
Figure 8:
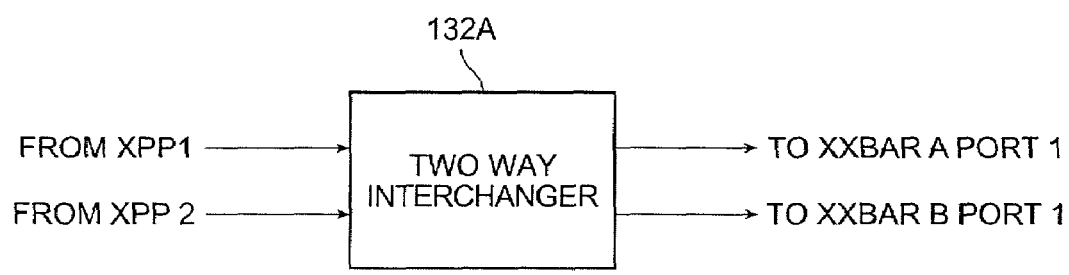
FIG. 8 is a block diagram depicting cell flow through a two-way interchanger associated with the crossbar subsystem of FIG. 7.

FIG. 7 is a schematic depiction of a crossbar subsystem 104 in accordance with a preferred embodiment of the present invention. In the preferred embodiment, each crossbar plane consists of four interchanger chips 118 and two crossbar chips 120A, 120B. Each interchanger 118 chip contains 32 two-way interchanger elements 132. Each interchanger element 132 receives cells 140 via I/Os 115 from two port processors 114, divides cells 140 into 16 portions 142 (in the manner described above) and sends portions 142 to the two crossbar chips 120 using one egress-side I/O link 130 for each connection between each element 132 and each chip 120. The choice of crossbar chip 120 to which portions 142 are sent is dependent upon a first characteristic of each portion that corresponds to each portion's sequential time slot within its corresponding cell. For instance, as shown in FIG. 8, a first interchanger 132A in the first interchanger chip (XINT #1) receives cells 140 from port processors 1 and 2 and sends cells 140 into port 1 on each of crossbar chips 120A, 120B.

Figure 9:
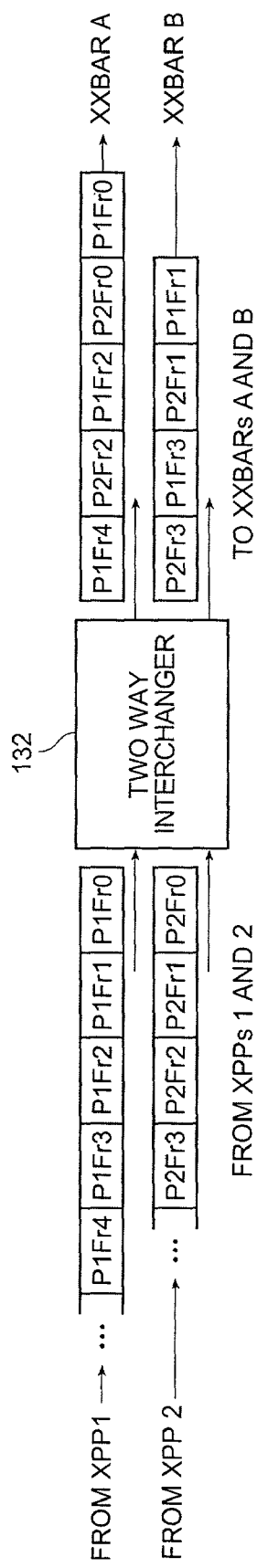
FIG. 9 is a block diagram depicting in further detail cell flow through a two-way interchanger associated with the crossbar subsystem of FIG. 7.

Cells 140 arrive from port processors 114 at an interchanger element 132 over 16 frame times. As shown in FIG. 9, interchanger element 132 performs the following simple function:

To crossbar A (120A) is routed: frame 0 (Fr0) from port processor 1 (P1), then frame 0 from port processor 2, then frame 2 from port processor 1, etc.

To crossbar B (120B) is routed: frame 1 from port processor 1, then frame 1 from port processor 2, then frame 3 from port processor 1, etc.

Because interchanger element 132 begins sending as soon as it receives the first frame of a cell 140, each of crossbar chips 120 receives the first frame of a particular cell 140 at a slightly different time. The purpose of this feature is to avoid adding extra buffering and latency.

Figure 10:
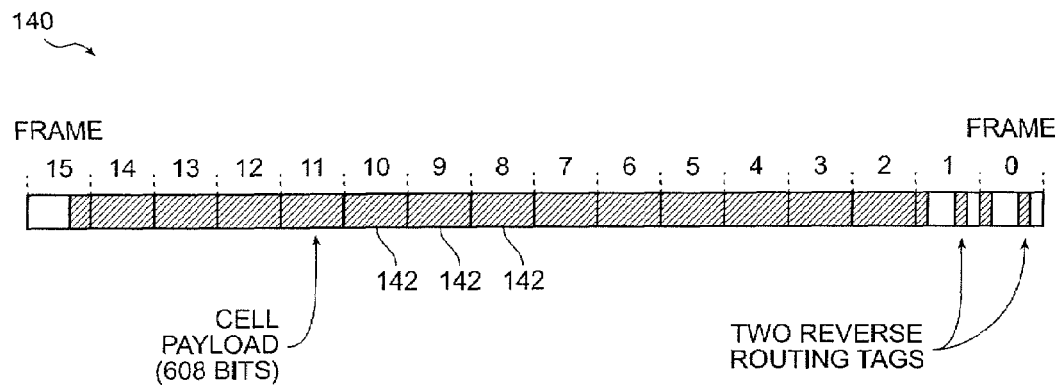
FIG. 10 is a schematic depiction of a cell manipulated by the switch core of FIG. 1.

The general format of a data cell 140 is shown in FIG. 10. In the preferred embodiment, cell 140 comprises 16 frame portions 142 in sequential time slots of equal duration. The first two frames (0, 1) of each cell 140 contain identical routing tags from a port processor 114. Incorporation of two reverse routing tags by each cell 140 ensures that each crossbar chip 120A, 120B will receive a routing tag from each port processor 114.

Figure 11:
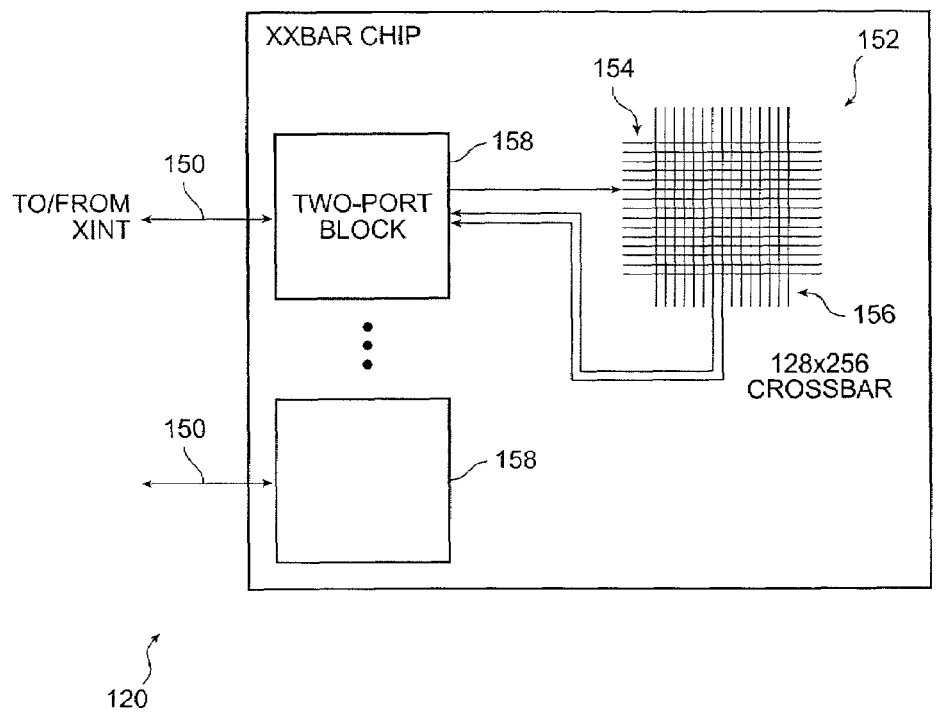
FIG. 11 is a schematic depiction of a crossbar chip associated with the crossbar subsystem of FIG. 7.

As best shown in FIG. 11, each crossbar chip 120 comprises 128 external I/O ports 150 and a 128×256 crossbar core 152 having 128 inputs 154 and 256 outputs 156. Each external port 150 is connected to a two-port queue block 158 of crossbar chip 120. Each block 158 drives one input 154 of crossbar core 152 and listens to two outputs 156 of core 152. The choice of block 158 to which portions 142 are sent is dependent upon a second characteristic of each portion that corresponds to the source port processor from which each portion originates.

Internally, crossbar core 152 functions in an alternating manner. In a first frame time, core 152 switches a frame 142 received from even-numbered port processors 114 in accordance with the second characteristic of frame 142. In the next frame time, core 152 switches a frame 142 received from odd-numbered input port processors 114 in accordance with the second characteristic of frame 142. As such, those frames 142 received from even-numbered port processors 114 may be regarded as having a third characteristic. Likewise, those frames 142 received from odd-numbered input port processors 114 may be regarded as having a fourth characteristic. This alternating pattern is repeated until each of frames 142 have been switched.

Each two-port block 158 cooperates with two consecutively-numbered input port processors 114 (for example, 1 and 2) that also serve as the output port processors with which block 158 cooperates. Block 158 is responsible for sending frames 142 into core 152 from each input port processor at the correct time. Block 158 is also responsible for sending into core 152 at the correct time reverse-routing tags indicative of the two output port processors in order to receive from the correct input frames 142 destined for such output port processors. Block 158 then receives frames 142 from core 152 and must send frames 142 out to interchanger 118 at the correct time.

In summary, block 158 sends frames 142 from the even-numbered port processor 114 with which it cooperates to core 152 in even-numbered frame times, and frames 142 from the odd-numbered port processor 114 with which it cooperates to core 152 in odd-numbered frame times.

Block 158 is connected and "listens" to two outputs 156 of core 152. The first output 156 "heard" by block 158 is always used by block 158 to receive the reverse-routing tag and receive the frame destined for the lower-numbered port processor 114. Thus, there is a fixed relationship between the port processor 114 that transmits a reverse-routing tag and the port 156 of core 152 that receives the tag. If the output port processors 114 with which block 158 cooperates are to receive frames 142 from both of either the odd-numbered port processors 114 or even-numbered port processors 114 with which block 158 cooperates, block 158 will "hear" both of outputs 156 simultaneously.

The time at which the reverse-routing tag is sent to core 152 depends on the value of the reverse-routing tag. If the reverse-routing tag specifies that the output port processor is to receive a cell from an even-numbered port processor, the reverse-routing tag must be sent into core 152 on the even-numbered frame times (i.e., the times at which the even-numbered port processors are sending their frames).

Further, the numerical value of the reverse-routing tag must be changed so that such value effects selection of one of the 128 inputs 154 of core 152 instead of selection of one of the 256 input port processors. This change is accomplished by dividing the reverse-routing tag value by 2. Thus, the value of the reverse-routing tag selects which two-port block will receive such tag, while the time at which the reverse-routing tag is sent in determines whether a frame is received from the even or odd port processor handled by the selected two-port block.

Note that the two-port blocks must have received reverse-routing tags from both of the port processors with which they cooperate before any switching can occur. This is because both of the port processors may need to receive from even-numbered port processors (which send their cells in first). Thus, the two-port block must receive and buffer up two frames before any switching can occur.

At the end of the two switching frame times, two-port block 158 has received and buffered frames 142 for each of its corresponding outputs 156 from which reverse routing tags were transmitted. These frames 142 are then transmitted via output port 150 in strict order of port correspondence to interchanger chips 118. Interchanger chips 118 reassemble frames 142 back into cells 140 of original form for transmission to the appropriate port processor chip 114. This operation is repeated over the next 14 frame times in order to transfer the cell payload across crossbar subsystem 104. During each frame time, crossbar subsystem 104 re-uses the routing tags that appeared in the first two frames, with each routing tag being used four more times by each crossbar.

Although the invention has been described in terms of the illustrative embodiment, it will be appreciated by those skilled in the art that various changes and modifications may be made to the illustrative embodiment without departing from the spirit or scope of the invention. For example, there may be more or fewer than four interchanger chips with corresponding more or fewer than two crossbar chips. It is intended that the scope of the invention not be limited in any way to the illustrative embodiment shown and described but that the invention be limited only by the claims appended hereto.

What is claimed is:

1. A method for routing data cells from at least one of a plurality of source port processors to at least one destination port processor, each cell comprising a plurality of cell frame portions, the method comprising the steps of:

transmitting the cell portions to at least one port, each cell portion having associated therewith a first characteristic and a second characteristic, said at least one port in communication with at least two of the plurality of source port processors, each cell portion being selectively transmitted according to said first characteristic to a corresponding one of at least one crossbar chip, each cell portion being selectively transmitted according to said second characteristic to a corresponding one of said ports;

selectively redirecting each cell portion according to said second characteristic to a corresponding one of said ports; and transmitting to a corresponding one of the at least one destination port processors each cell portion; wherein said first characteristic of each cell portion comprises the sequential time slot within the cell comprised of each cell portion.

2. The method of claim 1, further comprising:
   separating by frame each cell generated by the at least one source port processor into the cell portions.

3. The method of claim 1, wherein said at least one port is associated with at least one of said crossbar chips.

4. The method of claim 1, wherein said second characteristic of each cell portion comprises the identity of the source port processor from which each cell portion originates.

5. A crossbar subsystem associated with a switch core for routing data cells, each cell having at least one routing tag, the switch core having at least one port processor, the subsystem comprising:

a plurality of interchanger chips disposed in parallel; and
   a plurality of crossbar chips disposed in parallel, each said crossbar chip having at least one queue, a first plurality of first commination pathways across a first dimension of said crossbar chip, and a second plurality of second communication pathways across a second dimension of said crossbar chip, each said first communication pathway in communication with a corresponding one of said at least one queue, each said second pathway jointly with another of said second pathways in communication with a corresponding one of said at least one queue; wherein each said interchanger chip has a plurality of interchanger elements, each said interchanger element adapted to receive cells from two of the at least one port processors.

6. The apparatus of claim 5, wherein each said interchanger chip comprises a plurality of two-way ingress I/O nodes and a plurality of two-way egress I/O nodes.

7. The apparatus of claim 6, wherein each said interchanger ingress I/O node is in communication with at least one of the at least one port processor.

8. The apparatus of claim 5, wherein each said interchanger element is adopted to separate each cell into a plurality of time-based portions.

9. The apparatus of claim 5, wherein each said crossbar chip further comprises a plurality of two-way external ports.

10. The apparatus of claim 5, wherein said at least one queue comprises a two-port queue.

11. The apparatus of claim 5, wherein said second plurality is greater in number than said first plurality.

12. The apparatus of claim 5, wherein each said first pathway is in communication with each said second pathway.

13. The apparatus of claim 6, wherein:
   each said crossbar chip comprises a plurality of two-way external ports; and
   each said external port is in communication with a corresponding one of said interchanger egress I/O nodes.

14. A crossbar subsystem associated with a switch core for routing data cells, each cell having at least one routing tag, the switch core having at least one port processor, the subsystem comprising:

a plurality of interchanger chips disposed in parallel, each said interchanger chip having a plurality of two-way ingress I/O nodes and a plurality of two-way egress I/O nodes, each said interchanger ingress I/O node in communication with at least one of the at least one port processor, each said interchanger chip having a plurality of interchanger elements, each said interchanger element adapted to receive cells from two of the at least one port processors, each said interchanger element adapted to separate each cell into a plurality of time-based portions; and a plurality of crossbar chips disposed in parallel, each said crossbar chip having a plurality of two-way external ports, at least one two-port queue, a first plurality of first communication pathways across a first dimension of said crossbar chip, and a second plurality of second communication pathways across a second dimension of said crossbar chip, said second plurality being greater in number than said first plurality, each said first pathway in communication with each said second pathway, each said external port in communication with a corresponding one of said interchanger egress I/O nodes, each said first communication pathway in communication with a corresponding one of said at least one queue, each said second pathway jointly with another of said second pathways in communication with a corresponding one of said at least one queue.

* * * * *